May 7, 1929.　　　A. H. LINDE　　　1,712,222
BALL BEARING CAGE
Filed May 14, 1927　　2 Sheets-Sheet 1

WITNESS:
Robt R Kitchel.

INVENTOR
Andrew H. Linde
BY
Busser and Harding
ATTORNEYS.

May 7, 1929.  A. H. LINDE  1,712,222
BALL BEARING CAGE
Filed May 14, 1927  2 Sheets-Sheet 2

WITNESS:

INVENTOR
Andrew H. Linde
BY
ATTORNEYS.

Patented May 7, 1929.

1,712,222

UNITED STATES PATENT OFFICE.

ANDREW H. LINDE, OF PHILADELPHIA, PENNSYLVANIA.

BALL-BEARING CAGE.

Application filed May 14, 1927. Serial No. 191,292.

The object of my invention is to so construct a ball-retaining or roller-retaining separator or cage that it will be efficient, strong, durable and which may be easily and cheaply manufactured.

The invention comprises an improved cage possessing these qualities and the process of making it. Its construction, which is hereinafter fully described, is such that it is adapted to be made from flat sheet metal blanks that are bent or drawn into the form of half cages, which are secured together to form the complete cage. The features of novelty characterizing my improved cage and its method of production and the advantages arising therefrom are fully explained in the description of the preferred embodiments of the invention illustrated in the accompanying drawings, in which:—

Figures 1, 2:
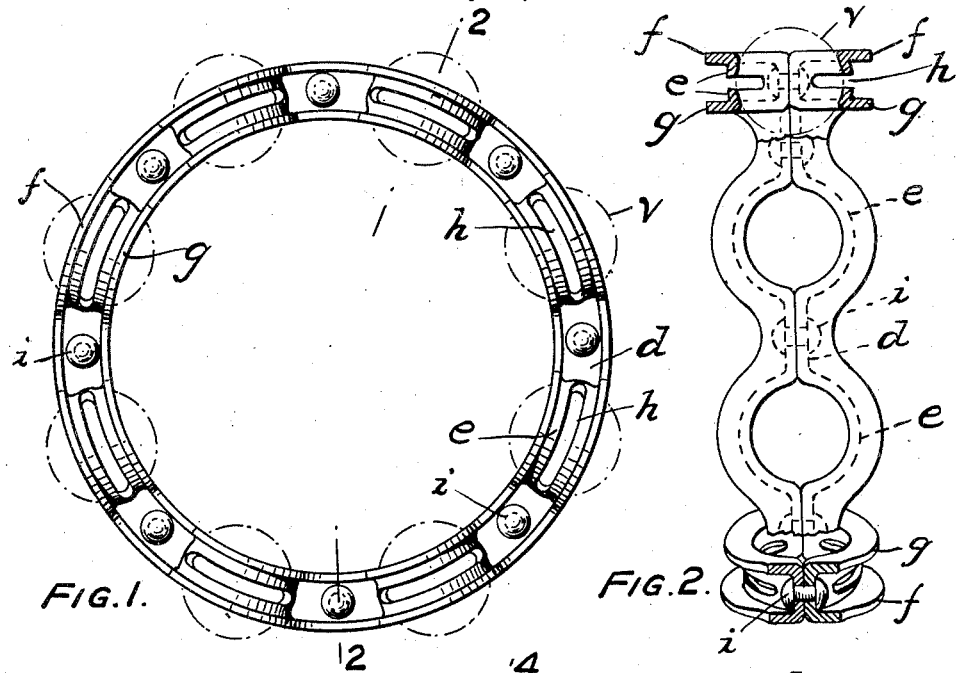
Fig. 1 is a front view of a ball cage.
Fig. 2 is an end view of a ball cage with parts thereof, on the lines 2—2 of Fig. 1, shown in section.
Figures 3, 4:
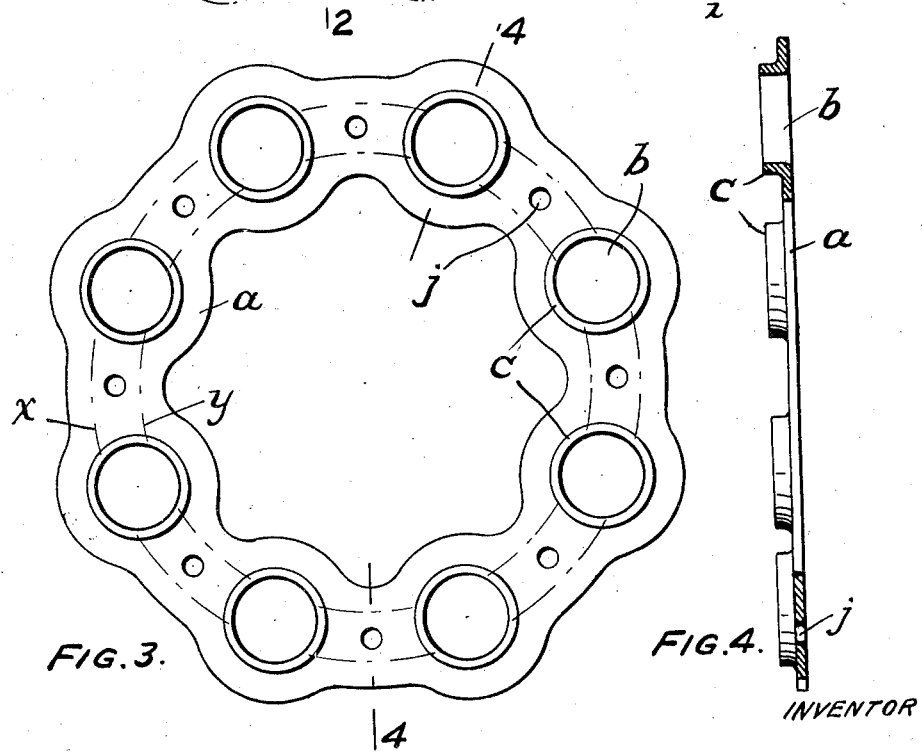
Fig. 3 is a plan view of the blank from which a half ball cage is formed and with the metal upset to form the ball-contacting flanges of the subsequently formed pockets.
Fig. 4 is a section of the blank of Fig. 3 on line 4—4.
Figure 5:
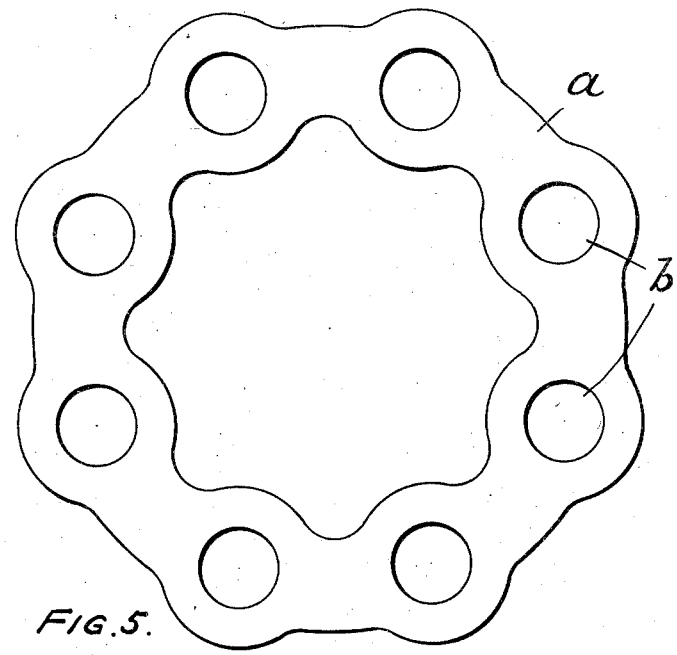
Fig. 5 is a plan view of the original flat blank.

In constructing my improved cage there are first formed two annular blanks $a$ of sheet metal, with inside and outside scalloped or fluted edges. In each of these blanks are punched as many holes $b$ as there are balls to be carried. One of these blanks is shown in Fig. 5. The metal adjacent the periphery of the holes is then upset or extruded to form annular flanges $c$ surrounding the holes $b$, as shown in Figs. 3 and 4. Each blank is then bent along two circumferential lines $x$ and $y$, on opposite sides of, and equidistant from, a circle along the axis of the blank containing the centers of the holes $b$, both lines intersecting all the holes, thereby forming a ring, approximately U-shaped in cross-section, comprising a central cylindrical web $d$ $e$ and two radial wings or webs $f$ and $g$. The central web is thereby so formed that it consists of flat sections $d$ alternating with arched sections $e$. The wings $f$ and $g$ are bent toward that side of the blank from which the flanges $c$ project, so that there is formed, by the concavity of each arch $e$, a half-pocket for one of the balls. The two rings are then assembled back to back, with their flat sections $d$ contacting, and these sections are secured together by appropriate means such as rivets $i$ (Figs. 1 and 2) extending through holes $j$ (Figs. 3 and 4) formed in the blank. When the rings are thus assembled and secured together, they form ball pockets, presenting two narrow, circular segments forming zones of contact with the balls. The ball-engaging segments present smooth rolled-over edges, all cut edges being on the outside, or open side, of the cage, thereby insuring against the balls becoming scratched by contact with cut or sharp edges. The ball-engaging segments are spaced apart, leaving narrow, elongated openings, or slots, $h$ in the arched sections $e$. By pinching opposing segmental members of a pocket toward each other, or by spreading them apart, the clearance between the balls and the pockets may be accurately adjusted.

During the transformation of the flat blank $a$ into the finished cage, those arcuate sections of the annular flanges $c$ that are outside the bending lines $x$ and $y$ are not changed and the pitch diameter is not altered. The scalloped edges formed in the flat blank present no sharp corners, whereby undue stretching of, or stresses on, the metal around the ball pockets is avoided.

Figure 6:
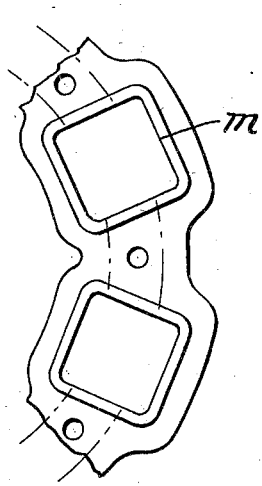
Fig. 6 is a view, similar to Fig. 2, of part of a blank used in the manufacture of roller cages.
Figure 7:
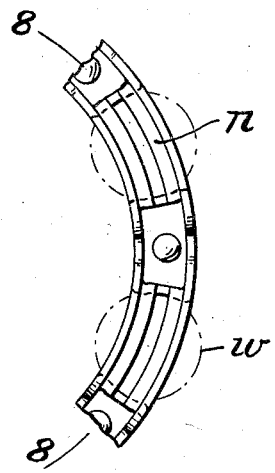
Fig. 7 is a view, similar to Fig. 1, of a part of a roller cage.
Figure 8:
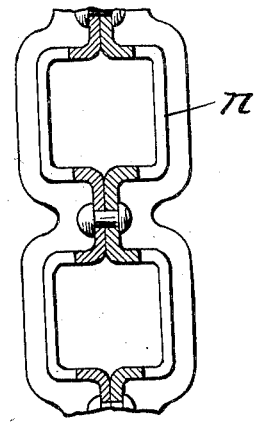
Fig. 8 is a section on the line 8—8 of Fig. 7.

When the cage is to be adapted to roller bearings, the openings $m$ for the pockets are made approximately square, as shown in Fig. 6 in order to provide arched arcuate sections $n$, Fig. 8, that are shaped approximately rectangularly instead of semi-circularly, therefore providing pockets adapted to conform to the cylindrical shape of the rollers $w$, Fig. 7. In other respects the construction is the same as that of the ball bearing cage hereinbefore described.

Where in the claims I use the word "ball", I intend it to comprehend the equivalent roller.

Having now fully described my invention, what I claim and desire to protect by Letters Patent is:

1. A cage for ball bearings comprising two metallic rings, each of which has arched sections and connecting sections alternating therewith, the rings being secured together so that the opposed arched sections of the rings form ball pockets, each arched section consisting of inner and outer wings, and each wing carrying a flange presenting a smooth surface contacting with a ball in its respective pocket.

2. A cage for ball bearings comprising two metallic rings, each of which has arched sections and connecting sections alternating therewith, the rings being secured together so that the opposed arched sections of the rings form ball pockets, each arched section consisting of inner and outer wings, and each wing carrying a flange presenting a smooth surface contacting with a ball in its respective pocket, the flanges in an arched section being spaced from each other whereby adjustment of the engagement of the ball may be effected by relative movement of opposed wings.

In testimony of which invention, I have hereunto set my hand, at Philadelphia, Pennsylvania, on this 23rd day of April, 1927.

ANDREW H. LINDE.